United States Patent [19]

Conger et al.

[11] 4,036,765

[45] July 19, 1977

[54] RUN-FLAT TIRE LUBRICANT

[75] Inventors: Marvin T. Conger, Akron; Roger N. Beers, Uniontown, both of Ohio

[73] Assignee: The Goodyear Tire & Rubber Company, Akron, Ohio

[21] Appl. No.: 585,923

[22] Filed: June 11, 1975

[51] Int. Cl.$^2$ .................. C10M 3/18; C10M 5/02; C10M 7/08; B60C 5/00

[52] U.S. Cl. .............. 252/21; 152/330 RF; 252/28; 252/42; 252/49.5; 252/52 A; 252/56 R; 152/330 L

[58] Field of Search ............ 252/21, 28, 42, 42.1, 252/52 A, 49.5, 56 R; 152/330 L

[56] References Cited

U.S. PATENT DOCUMENTS

| | | | |
|---|---|---|---|
| 2,958,659 | 11/1960 | Brown | 252/49.5 |
| 3,454,495 | 7/1969 | Schneider | 252/21 |
| 3,522,177 | 7/1970 | Benz | 252/21 |
| 3,526,594 | 9/1970 | Meghir | 152/330 L |
| 3,610,308 | 10/1971 | McDonald | 152/330 L |
| 3,663,437 | 5/1972 | Moore et al. | 252/42.1 |
| 3,739,829 | 6/1973 | Powell et al. | 152/330 L |

FOREIGN PATENT DOCUMENTS

| | | | |
|---|---|---|---|
| 1,359,468 | 7/1974 | United Kingdom | 152/330 L |

*Primary Examiner*—Delbert E. Gantz
*Assistant Examiner*—Irving Vaughn
*Attorney, Agent, or Firm*—F. W. Brunner; J. D. Wolfe

[57] ABSTRACT

A lubricant for use with a pneumatic tire wheel assembly containing a run-flat device to permit the tire to run at least 50 miles at 50 miles per hour in the deflated condition, the lubricant comprising a mixture of 2 to 60 parts of fatty acid having from 12 to 24 carbon atoms, 0 to 45 parts metal soap of a fatty acid having from 12 to 24 carbon atoms and 40 to 92 parts of a carrier such as water or a polyol having a carbon to oxygen ratio less than 4 to 1.

5 Claims, No Drawings

RUN-FLAT TIRE LUBRICANT

This invention relates to a lubricant characterized by being essentially nonflowable at temperatures below 70° C. and being relatively fluid and flowable at temperatures of 90° C. and higher.

More particularly, this invention relates to a lubricant for a pneumatic tire and wheel assembly where the lubricant functions primarily when the tire is being operated in the flat condition.

For a number of years the automobile and tire manufacturers have attempted to provide tires for automobiles that could be operated for up to 50 miles in the flat condition and thereby eliminate the need to provide a fifth or spare tire with each automobile sold and to eliminate the need to utilize trunk space to store the extra wheel and tire assembly. In general, these attempts to eliminate the spare tire have taken two approaches, namely the multiple chambered tire or the so-called safety wheel, and tire run-flat member assembly which are respectively illustrated in their mechanical features in British Pat. No. 835,334, British Pat. No. 1,359,469 and U.S. Pat. No. 3,828,836.

It has been known for some time that a lubricant such as those described in U.S. Pat. No. 3,739,829 could be used to advantage in the aforesaid safety tire and wheel assemblies. Unfortunately, the lubricants proposed had the disadvantage of being fluid and flowable. Therefore, considerable research and development effort has been devoted over the years to methods of packaging these fluid lubricants to maintain them in the desired position until they were needed on the tire losing its air inflation and thus prevent the wheel and tire assembly from becoming unbalanced. A further disadvantage of these systems is the difficulty of mounting and balancing the tire with the above lubricant systems.

We have discovered that a lubricant that is essentially nonflowing at temperatures less than 70° C. but which becomes fluid or flowable at 90° C. or higher can be placed in the tire and will remain in position in the tire even under centrifugal force until the tire becomes flat. This lubricant will become fluid and flow into the area where the lubricant is needed to keep the tire from being ruined by overheating while running in the run-flat condition, since the tire will heat to 90° C. or higher under these service conditions. This lubricant generally comprises a fatty acid and an alkali or alkaline earth metal soap and a carrier in which the soap has appreciable solubility but the fatty acid is essentially insoluble with their proportions being adjusted to give a gel at temperatures less than 70° C. and a fluid at temperatures of 90° C. and higher. The carrier suitable for use in making the lubricants for this invention comprises water, ethylene glycol and its lower homologs having less than 4 carbon atoms per oxygen atom and the polymers of these glycols which have an overall oxygen to carbon ratio less than 1 to 4.

To be more specific, in addition to ethylene glycol, the polyethylene ether glycol or triol, polypropylene ether glycol or triol, glycerol, diethylene glycol, triethylene glycol, and mixtures of these may be utilized as a carrier in the making of lubricants in this invention. In general, the soap to fatty acid ratio may range from 3/1 to 0/1 in order that the mixture of the fatty acid and soap at weight levels of approximately eight percent to 60 percent, based on the carrier, will give a gel having the ability to yield a fluid at temperatures of 90° C. and greater.

In general, the lubricants of this invention can be prepared by mixing the fatty acid and the soap with the desired amount of carrier at a temperature of about 70° C. up to that where a fluid mixture is obtained. It should be appreciated that the soaps can be generated in situ by partially saponifying the fatty acid to give the desired ratio of fatty acid to soap and then adjusting the amount of carrier by adding the specific carrier or boiling away any excess water which may be present due to the saponification reaction. The lubricant prepared in the above manner is then melted at a temperature of approximately 90° C. or higher and distributed uniformly around the interior of the tire and allowed to congeal or gel and then the tire is mounted on the rim of the wheel in the conventional manner using the specific safety member desired with this wheel and tire assembly. Then the wheel and tire assembly is mounted on the automobile or vehicle in the conventional manner with the tire being inflated at the conventional pressures recommended for the service to which the tire will be subjected. A vehicle having tires thereon of the type indicated had the tire punctured to produce a tire with a flat thereon and this tire was run 50 miles at speeds of approximately 55 miles an hour and thus it was found that on testing the tire the temperature of the tire had been maintained at a temperature below that at which the tire would have been ruined by overheating.

The lubricant of this invention useful for a pneumatic tire run-flat assembly comprising a mixture of 2 to 60 parts of a fatty acid having from 12 to 24 carbon atoms, 0 to 45 parts of a metal soap of a fatty acid having from 12 to 24 carbon atoms and the metal of said soap being selected from the metals of Group IA, IIA and IIIA of the Periodic Table set forth at Vol. 39 (1957-58) *Handbook of Chemistry and Physics* and 40 to 92 parts of a carrier selected from the class consisting of water, polypropylene ether glycol or triol of 400 to 3500 molecular weight, polyethylene ether glycol or triol of 400 to 3800 molecular weight, polyols of 2 to 4 hydroxyls having a molecular weight of less than 400 and 0 to 20 parts of a powdery pyrogenic silica and the preferred polyols are those of 2 to 3 hydroxyls.

The nature of this invention will be more readily appreciated and its advantages understood from the following examples wherein all parts and percentages are by weight unless otherwise indicated

EXAMPLE I

Three hundred fifty parts of polyethylene glycol of approximately 450 molecular weight, 70 parts of stearic acid and 35 parts of potassium stearate were placed in a vessel equipped with a stirrer and heated to 70° C. with stirring until the mixture became liquid. This liquid lubricant was poured on the inside of a steel belted radial tire as the tire was slowly rotated to give a uniform gel coating on the inside surface of the tire. Usually about 100 to 200 grams of the lubricant is sufficient for the usual automobile tire, sizes, i.e. 13, 14 and 15 inch passenger tires. As soon as the lubricant cooled to 60° C. it gelled, was no longer flowable and the tire was mounted on the rim of a wheel of an automobile tire. This wheel was equipped with a fiberglass stabilizer or run-flat device. The tire was inflated to approximately 28 pounds per square inch air pressure and after being run in the inflated condition, the tire in the inflated condition was deflated and run 50 miles per hour for 50 miles in the deflated condition. After being run under these conditions the tread was found to have a maximum temperature of 110° C. The holes punched in the tire to effect this deflation were patched and the tire was ready for reuse again.

EXAMPLE II

A lubricant was made by the procedure of Example I except that the polyethylene glycol was replaced by polypropylene ether glycol of 1000 molecular weight. This lubricant was heated to approximately 100° C. and poured on the inside of a rotating steel belted radial tire. The lubricant congealed inside the tire when the temperature cooled below 75° C., the melting point of the lubricant. This tire was mounted on the wheel assembly having a run-flat device and then was run 50 miles at 50 miles per hour under flat conditions. The maximum temperature of the tire during this test was 97° C. and upon reinflation the tire was ready for further service.

EXAMPLE III

A gel type lubricant was made by heating and mixing 525 parts of glycerine, 105 parts stearic acid and 52.5 parts potassium stearate to produce a gel on coating below 64° C. A steel belted radial tire containing this lubricant and mounted on a wheel with a fiberglass run-flat stabilizer ran 50 miles at 50 miles per hour (mph) in flat condition. The maximum tread temperature during the test was 110° C. When this test was repeated without the lubricant the maximum tread temperature exceeded 205° C. in a short time and the tire is frequently destroyed by this high temperature effect in a very short distance.

EXAMPLE IV

Another lubricant was made by first placing 100 parts of water in a stirred mixing vessel and adding 25 parts stearic acid to water at 70° C., the melting point of stearic acid, then 25 parts of potassium stearate was added and stirred until the ingredients became liquid and homogeneous mass was obtained. Upon coating a thick jelly formed which became liquid on standing in a 93° C. oven.

EXAMPLE V

Satisfactory lubricants were made by the procedure of Example IV with Recipes No. 1 and 2.

| Recipe Number | 1 | 2 |
| --- | --- | --- |
| Water, parts | 100 | 100 |
| Stearic acid | 20 | 100 |
| Potassium stearate | 10 | 45 |

EXAMPLE VI

Stearic acid (20 parts) and potassium stearate (10 parts) were intimately mixed in a dry-blender and then 100 parts of boiling water was added and was stirred to form a dispersion. A jelly formed on cooling the dispersion to 60° C.

EXAMPLE VII

Potassium stearate (50 parts), stearic acid (100 parts) and powdery pyrogenic silica-, Cab-O-Sil (5 parts) were blended in a dry blender. Then 500 parts of hot water was added to dry blend and stirred until visible solids disappeared. On cooling to 60° C. or lower, a relatively stiff jelly formed. The powdery pyrongenic silica increased the stiffness of the jelly, but the jelly performed satisfactory as a lubricant for a tire operating deflated on a 40 to 60 percent section-height stabilizer. Also, this lubricant, like those of other examples, could be washed readily from the tire cavity with water to permit the tire to be patched or repaired.

Potassium soaps have been utilized in the preceding examples to exemplify the invention, but it should be appreciated that the sodium soaps of the fatty acids can be used to replace the potassium soaps in these examples and in many cases the sodium soaps of stearic acid, oleic acid and the animal or vegetable fatty acids give lubricants having preferred lubricating characteristics. Likewise, the metal soaps of the metals of Group IA, IIA and IIIA can be used.

It should be appreciated that when water is the carrier there must be at least 2 percent and preferably four to 25 percent of the metal soap present, based on the water, to give the desired jel properties and the desired melting ranges. Mixtures of the metal soaps and mixtures of the carriers can be used, as well.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire run-flat assembly lubricant which is nonflowable below 70° C. and flowable at temperatures higher then 90° C. consisting of a mixture on a by-weight basis of 2 to 60 parts of a fatty acid having from 12 to 24 carbon atoms, 0 to 45 parts of a metal soap of a fatty acid having from 12 to 24 carbon atoms and the metal of said soap being selected from the metals of Group IA, IIA and IIIA of the Periodic Table set forth at Vol. 39 (1957-58) *Handbook of Chemistry and Physics* and 40 to 92 parts of a carrier selected from the group consisting of water, polypropylene ether glycol or triol of 400 to 3500 molecular weight, polyethylene ether glycol or triol of 400 to 3800 molecular weight, polyols of 2 to 4 hydroxyls having a molecular weight of less then 400 and 0 to 20 parts of a powdery pyrogenic silica, with the proviso that when the carrier is water the amount of soap is at least two percent by weight based on the water.

2. The lubricant of claim 1 wherein the carrier is water and the soap is present in amounts of 4 to 25 percent, based on water.

3. The lubricant of claim 2 wherein the metal of the soap is sodium or potassium.

4. The lubricant of claim 1 wherein the carrier is polyethlene ether glycol or polypropylene ether glycol.

5. The lubricant of claim 1 wherein the metal of the soap is sodium or potassium.

* * * * *